Figure 1:
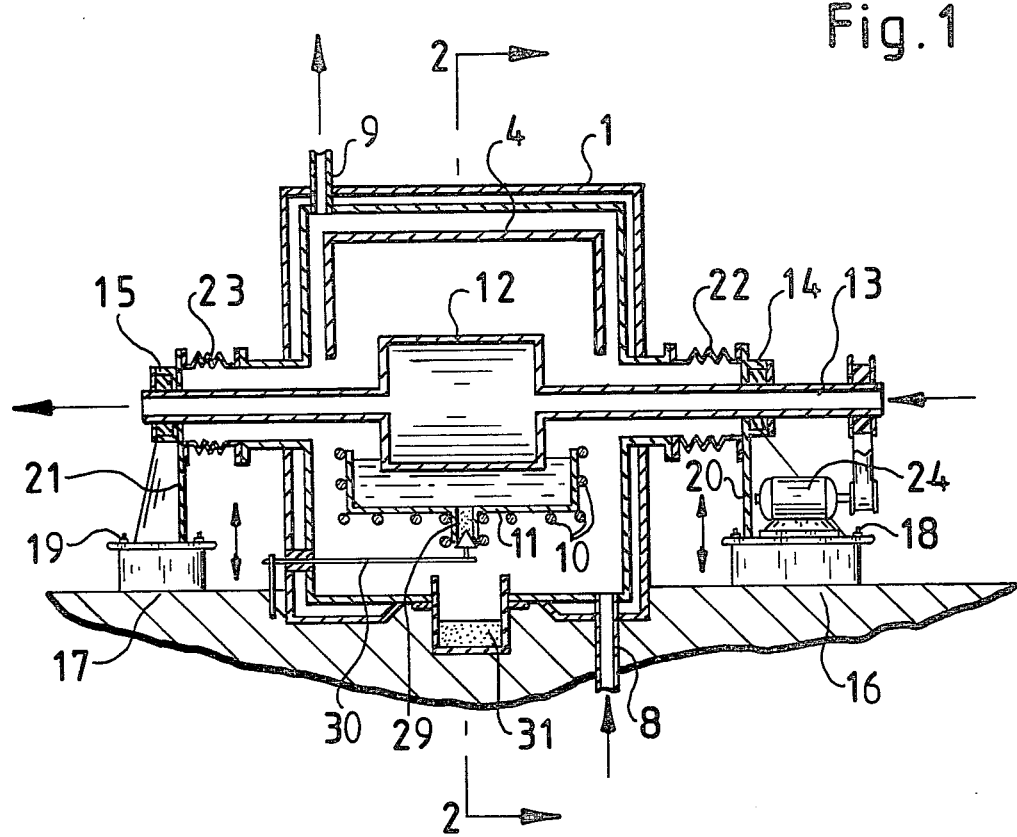

United States Patent [19]

Herzer et al.

[11] 4,231,755
[45] Nov. 4, 1980

[54] PROCESS FOR PURIFYING SOLID SUBSTANCES

[75] Inventors: Heinz Herzer; Heinz-Jorg Rath; Dietrich Schmidt, all of Burghausen, Fed. Rep. of Germany

[73] Assignee: Wacker-Chemitronic Gesellschaft für Elektronik-Grundstoffe mbH, Burghausen, Fed. Rep. of Germany

[21] Appl. No.: 907,442

[22] Filed: May 19, 1978

[30] Foreign Application Priority Data

May 20, 1977 [DE] Fed. Rep. of Germany ....... 2722784

[51] Int. Cl.³ .............................................. B01D 9/04
[52] U.S. Cl. ................................ 23/293 R; 23/295 R; 156/DIG. 64; 62/532
[58] Field of Search .................. 23/293 R, 295 R; 427/86; 62/532, 544, 545; 156/624, DIG. 64

[56] References Cited

U.S. PATENT DOCUMENTS

| 290,016 | 12/1883 | Fairfield | 62/545 |
| 2,651,922 | 9/1953 | Graham | 62/545 |
| 2,904,412 | 9/1959 | McBride | 23/295 |
| 3,400,548 | 9/1968 | Drayer | 62/545 |
| 3,966,445 | 6/1976 | Adams | 23/295 R |

FOREIGN PATENT DOCUMENTS

2057985  6/1971  Fed. Rep. of Germany ........ 23/295 R

*Primary Examiner*—Hiram H. Bernstein
*Attorney, Agent, or Firm*—Allison C. Collard; Thomas M. Galgano

[57] ABSTRACT

A process for purifying solid substances by melting and subsequent resolidification, wherein a melted bath of the solid substance is formed, a roller is placed in the bath so that a first portion of its surface is in contact with the melted substance, and the surface of the roller is cooled to a temperature below the melting point of the solid substance. The cooled roller is rotated in the melted substance to collect a solidified film of the substance on the roller surface. A second portion of the roller surface is passed through a heated zone at a temperature above the melting point of the solid substance, so that the solidified film is remelted and collected in an appliance.

5 Claims, 2 Drawing Figures

PROCESS FOR PURIFYING SOLID SUBSTANCES

The present invention relates to a process for purifying solid substances, especially silicon, by melting and subsequent resolidification.

On discussions on energy in recent years, the generation of current by the direct conversion of solar energy into electrical energy has gained increasing importance. In order, however, to push forward into economically competitive fields with, for example, silicon solar cells, it is necessary for the basic material, which is present on earth in inexhaustive quantities, to be made available in the desired degree of purity at a substantially lower cost. Purification via the gas phase, which is at present the customary method of obtaining silicon for the electronics industry, is excluded from the start since processes of this type are too energy-intensive and are therefore far too expensive. In addition, it is not necessary that such high requirements be made concerning the purity of silicon required for the production of solar cells, in comparison with the requirements of "wafer silicon" for the production of high-quality components.

Although it is known from Swiss Pat. No. 567,435 to purify industrial silicon by leaching with hydrochloric acid, this process is extremely lengthy, and results in silicon without special subsequent purification. The silicon can be used at best as a constituent of an alloy, but not as a basic material for the production of electronic components or of solar cells. Moreover, purer silicon cannot be obtained by the known process of gas blowing. In this process, as described in German Pat. No. 10 39 752, the silicon is purified by blowing chlorine into the melt.

The problem underlying the invention was therefore to find a process for the purification of silicon that yields a product which is purer than the products obtained by the above-mentioned processes, and that is simultaneously substantially less expensive than the purification process effected by decomposing gaseous silicon compounds.

This problem is solved by a process which is not limited to silicon alone but can be used generally for the purification of solid substances, wherein a rotating roller, which consists of material that is inert with respect to the solid substance to be purified and is cooled to a temperature below the melting point of the solid substance to be purified, is immersed in the molten substance. The solidified substance adhering to the surface of the roller when the roller emerges from the melt passes through a zone, connected in series, in which the temperature is above the melting point of the solid substance to be purified, and in which the solid substance adhering to the roller is remelted and is collected in a suitable appliance.

Irrespective of the particular solid substance to be purified, the parameters influencing the crystal growth, such as the depth of immersion of the roller, the speed with which a point on the surface of the roller is conveyed through the melt, the temperature of the melt of the substance to be purified and the temperature of the roller, are so adjusted with respect to each other that a speed of crystallization perpendicular to the surface of approximately 0.01 to 2 cm/min, preferably approximately 0.2 to 1 cm/min, is achieved. The desired layer thickness of the material adhering to the surface of the roller is approximately 0.005 to 0.05 times, preferably 0.01 to 0.02 times, the diameter of the roller. The necessary depth of immersion of the roller in the melt is set at 0.01 to 0.3 times, preferably 0.1 to 0.2 times, the diameter of the roller.

The rotational speed of the roller is such that the dwell or residence time of the surface of the roller immersed in the melt of the substance to be purified, measured in minutes, is 0.0025 to 0.5, preferably 0.005 to 0.25 times the numerical value of the roller diameter. The temperature of the melt should generally be no more than 400° C. above the melting point of the solid substance to be purified.

Good results are usually obtained, especially in the case of substances having low melting points, with melt temperatures that are approximately 20° to 100° C. above the melting point. In the preferred case of silicon purification, for example, a temperature of the silicon melt of 1430° to 1500° C. has proved advantageous.

The melt can be heated according to customary methods, for example by resistance heating, heating by radiant heat or, in the case of silicon, by means of suitable induction heating.

The temperature of the roller rotating through the melt is obviously dependent of the temperature that has been set for the melt. If the melt temperature is very far above the melting point of the solid substance to be purified, then generally the temperature of the roller must be very low, that is, very far below the melting point of the solid substance to be purified, so as to achieve overall crystallization at the surface of the roller as it passes through the melt. If, accordingly, the temperature of the melt is, for example, 400° C. above the melting point of the solid substance to be purified, the roller must be cooled to a temperature that is at least 400° to 800° C. below the melting point of the solid substance to be purified. In the preferred arrangement of the process, however, as already mentioned, the selected temperature of the melt is advantageously only slightly above the melting point of the solid substance to be purified, so that, accordingly, a roller temperature that is not so far below the melting point of the solid substance to be purified is adequate. In the case of the purification of silicon melts, which, as already stated, are advantageously maintained at a temperature of 1430° to 1500° C., a roller temperature of 800° to 1200° C., measured at the inner surface of the roller through which coolant passes, is accordingly recommended. The temperature ranges indicated are to be understood as average temperatures, since the part of the roller that has just been immersed in the melt obviously has a higher temperature than the part of the roller projecting from the melt which has already been out of the melt for some time.

To cool the roller, a cooling medium is passed through it, the nature of which depends essentially on the temperatures to be set. Accordingly, if solid substances having a low melting point are used so that cooling temperatures must be set at below 100° C., for example a liquid cooling medium, especially water, can be used. In the case of even higher temperatures, while in the preferred application of the process for silicon, a gaseous cooling media, such as nitrogen or argon flowing through the cooling roller, have proved advantageous.

The material of the crucible in which the solid substance to be purified is melted must in general be inert towards the solid substance to be purified, that is to say, it must not cause additional contamination of this solid substance. In the case of silicon, therefore, quartz, for example, or especially glassy carbon, is suitable. The requirements that must be met by the crucible material apply correspondingly also to the rollers used. In this case, the additional requirement that the roller is wetted by the solid substance to be purified must be met, since otherwise a crystallization layer adhering to the surface of the roller would not be formed. To purify semiconductor substances, such as, in particular, silicon, glassy carbon has proved particularly suitable as the roller material.

The effective liquation coefficients of the particular impurity considered are decisive for the purifying action. After the solid substance purified continuously by way of the roller, that is, for example, purified silicon, has been removed, the impurities remaining in the melt accumulate. The purifying action can therefore be increased, for example, by rotating the crucible, by using an agitator which moves the melt or, for example, by introducing a gas which causes turbulence and results in better blending in the melt. If the process is to be carried out continuously, the silicon can be continuously recharged, while the melt, with a high concentration of impurities, is drawn off below either continuously or periodically. The melt containing a high proportion of impurities can then be repurified outside the vessel according to known processes, such as by leaching with acids, before it is returned to the melting crucible.

The layer of solidified substance adhering to the surface of the roller is remelted before the respective point of the surface of the roller re-enters the melt. This remelting is preferably effected at a distance before re-immersion of the roller measured on the circumference of the roller, within the range of from $0.25\pi$ to $0.5\pi$ times the diameter of the roller. The adhering solid substance, such as the crystallized silicon, can be remelted, for example, by a water-cooled, high-frequency finger installed along the roller. This finger can be, for example, a single-threaded copper or silver coil, which couples with the silicon adhering laterally to the roller. Another method of melting is by means of light, focused by a concentrating reflector with a suitable laser irradiation. If the process is carried out in a high vacuum, the melting could be carried out by means of an oscillating electron beam.

The solid substance, remelted by one of the above methods, drops off the roller, as a result of gravity and, with the aid of a scraper, is collected in a suitable appliance, for example, a melt channel, and is then conveyed away from the reactor. The melt of purified solid substance which is drawn off, can then be conveyed, for example, directly to a second corresponding purifying arrangement. By connecting several such arrangements in series, one after the other, a considerable increase in the purifying action can be achieved.

The efficiency of the purifying process depends generally on the effective liquation coefficient (segregation coefficient, distribution coefficient). The effective liquation coefficient differs from the theoretical liquation coefficient, since it takes into consideration such factors as, for example, the blending of the melt, the speed of crystallization, and the crystallite size.

The process can generally be carried out at pressures of $10^{-9}$ to 2 bars wherein operation in vacuo is preferred, since the purifying action can be improved because of the evaporation of foreign substances in accordance with their respective evaporation coefficients.

The process is particularly suitable for purifying metals, and expecially semiconductor materials, such as, for example, germanium or silicon. Its greatest importance lies, without doubt, in the purification of silicon, which with certainty will have to be available in the near future in enormous quantities for the production of solar cells. Since the purifying action of the process described is dependent on the liquation coefficients of the impurities, the impurity boron with a distribution coefficient of approximately 0.8 is practically impossible to remove from the silicon. This is of no importance, however, since p-doped, and therefore, for example, boron doped silicon is, in any case, used for the production of solar cells.

The process according to the invention is explained by way of example with reference to the drawings.

Figure 2:
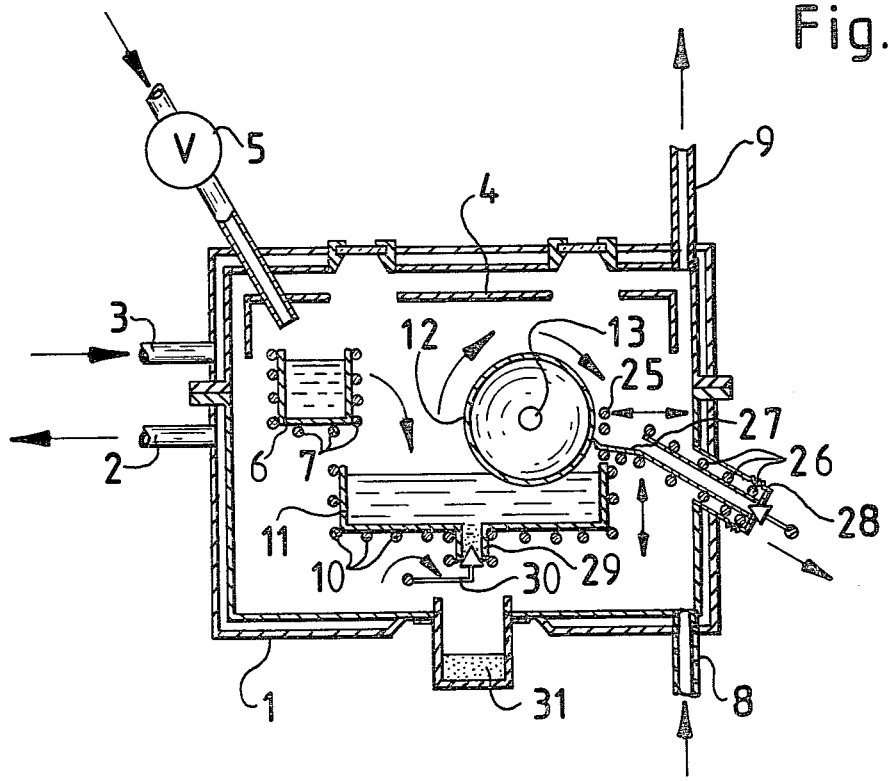

FIG. 1 is a schematic representation in lateral cross-section of an apparatus suitable for carrying out the process according to the invention; and FIG. 2 shows a front cross-sectional view taken through section 2—2 of FIG. 1.

Referring to FIGS. 1 and 2, 120 kg of silicon having an iron content of 10 ppm are introduced through a closeable pipe 5 into a steel reactor 1, which has a double walled outer casing through which cooling water can flow by way of the pipe lines 2 and 3. Reactor 1 is provided on the inside with a molybdenum sheet beam reflector 4, and the silicon is melted under argon in a glassy carbon crucible 6 having a volume of 0.04 m$^3$, which is heated by a resistance heater 7. Before melting, the air in the reactor was displaced through the open outlet 9 by introducing argon through pipe line 8. The molten silicon was then poured, by tilting crucible 6, into the crucible 11 beneath, which is provided with a resistance heater 10 and likewise is made of glassy carbon. Crucible 6 is continually refilled with silicon by reloading silicon through the inlet pipe 5. Crucible 11 has a length of 70 cm, a width of 50 cm and a depth of 20 cm. A roller 12 consisting of glassy carbon was then lowered into the melt to a depth of 4 cm. The roller has an outer diameter of 30 cm, a length of 50 cm with a wall thickness of 0.4 cm, and is mounted by means of the hollow shaft 13, which surrounds the longitudinal axis on both sides, in a graphite-lubricated bearing in mountings 14 and 15. The distance of mountings 14 and 15 from bases 16 and 17 respectively can be adjusted by adjusting screws 18 and 19 respectively on the supporting means 20 and 21 respectively. By these means and by means of the gas-tight special steel accordion pleated wall units 22 and 23, it is possible for mountings 14 and 15 respectively to be lowered and for roller 12 accordingly to be lowered into the melt.

Roller 12 is rotated at 9.5 rev/h by means of an electric motor 24 via a drive, corresponding to a circumferential speed of a point on the surface about the longitudinal axis of 14.25 cm/min. During this rotation, argon of a temperature of approximately 25° was conveyed through the hollow shaft in a quantity of 2 standard m$^3$/h, as a result of which an average temperature of the inner surface of the roller of 1000° C. was obtained. At a crystallization speed of approximately 0.4 cm/min perpendicular to the surface, the layer of silicon on the surface of the roller grew on emergence from the melt to a thickness of approximately 0.6 cm. After passing through an arc distance of approximately 220° after emergence from the melt, corresponding to a distance from the melt before re-immersion of approximately 15 cm, measured on the circumference of the roller, the adhering layer of silicon was melted again by means of a single threaded, water-cooled, copper induction-heating coil 25, so that the liquid silicon dropped off and was conveyed out of the reaction by way of a discharge channel 27, heated to a temperature above the melting point of the silicon by means of a resistance heater 26. The side arm 28 receiving the silicon discharged could be selectively connected to an argon-charged silicon-collecting vessel or to inlet pipe 5 of a second corresponding purification plant. In the example described here, however, only one purification step was carried out. The silicon was collected and its degree of purity was determined. With a removal of approximately 59 kg/h of purified material, the process was stopped after 48 hours. During this time, approximately 4 kg/h of melt with a high concentration of impurities was discharged periodically through discharge pipe 29, arranged in the base of crucible 11, by operating lever 30, into glassy carbon vessel 31, which can be removed by unscrewing it. The 190 kg of residual melt collected after 48 hours was repurified by leaching with hydrochloric acid and added to the silicon of a new batch. The 2832 kg of purified silicon obtained in the same time had an iron content of only 10 ppb by weight. The removal of the other impurities was correspondingly extensive with the exception of boron and to a limited extent phosphorous. The p-conducting silicon obtained could immediately be cast into appropriate plates for the production of solar cells.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process for purifying semiconductor silicon by melting and subsequent resolidification, the improvement comprising the steps of:

forming a melted bath of the silicon to be purified at a temperature between 1430° and 1500° C.;

disposing a roller in the bath to a depth of between 0.01 to 0.3 times the diameter of the roller;

cooling the roller internally to a temperature between 800° and 1200° C.;

rotating the cooled roller in the melted silicon to form a solidified silicon film, wherein the residence time of the roller surface in the melted silicon, measured in minutes, is 0.0025 to 0.5 times the numerical value for the roller diameter;

remelting the silicon film formed on said roller at a distance of 0.1 to 0.5 d. $\pi$ from the surface of the melt, measured on the circumference of the roller, wherein d. is the diameter of the roller; and collecting the remelted silicon in an appliance.

2. The process according to claim 1, wherein the depth of immersion of the roller is set at 0.1 to 0.2 times the diameter of the roller.

3. The process according to claim 1, wherein the residence time of the surface of the roller dipping into the melt of the substance to be purified, measured in minutes, is 0.005 to 0.25 times the numerical value for the roller diameter.

4. The process according to claim 1, wherein the roller is cooled by a coolant gas flowing through the inside of the roller.

5. In a process for purifying semiconductor silicon by melting and subsequent resolidification, wherein the purifying action of the process is dependent upon the segregation coefficients of the impurities, the improvement comprising the steps of:

forming a melted bath of the silicon to be purified at a temperature between 1430° and 1500° C.;

disposing a roller in the bath to a depth of between 0.01 to 0.3 times the diameter of the roller;

cooling the roller internally to a temperature between 800° and 1200° C.;

rotating the cooled roller in the melted silicon to form a solidified silicon film, wherein the residence time of the roller surface in the melted silicon, measured in minutes, is 0.0025 to 0.5 times the numerical value for the roller diameter, said silicon film containing substantially less impurities than the melted bath from which it was formed due to the segregation coefficients of the impurities contained therein;

remelting the silicon film formed on said roller at a distance of 0.1 to 0.5 d. $\pi$ from the surface of the melt, measured on the circumference of the roller, wherein d. is the diameter of the roller;

collecting the remelted purified silicon in an appliance; and casting said purified silicon into plates for the production of solar cells.

* * * * *